United States Patent [19]

Weber et al.

[11] 4,165,283
[45] Aug. 21, 1979

[54] MULTI-STAGE PURIFICATION SYSTEM

[75] Inventors: Roland E. Weber, Holyoke; Carl J. Zimmermann, Ludlow, both of Mass.

[73] Assignee: Industrial Pollution Control Corp., Ludlow, Mass.

[21] Appl. No.: 782,435

[22] Filed: Mar. 29, 1977

Related U.S. Application Data

[63] Continuation-in-part of Ser. No. 736,550, Oct. 28, 1976, abandoned, which is a continuation of Ser. No. 411,248, Oct. 31, 1973, abandoned.

[51] Int. Cl.² .................. B01D 21/26; B01D 29/42
[52] U.S. Cl. .................. 210/111; 210/193; 210/256; 210/261; 210/298; 210/311; 210/313; 210/323 T; 210/332; 100/116
[58] Field of Search ............. 100/116, 117, 145–150, 100/295; 210/19, 73 R, 73 S, 73 W, 75, 82, 193, 256, 261, 323 T, 332, 407, 415, 456, 111, 311

[56] References Cited

U.S. PATENT DOCUMENTS

| 825,957 | 7/1906 | Buckley | 100/116 X |
|---|---|---|---|
| 1,263,226 | 4/1918 | Genter | 210/111 X |
| 1,269,700 | 6/1918 | Genter | 210/19 |
| 1,345,963 | 7/1920 | Santos | 100/116 |
| 1,452,151 | 4/1923 | Genter et al. | 210/19 |
| 1,935,642 | 11/1933 | Laughlin | 210/311 X |
| 2,427,446 | 9/1947 | de la Roza, Sr. | 100/116 X |
| 2,492,233 | 12/1949 | Meeker | 100/145 X |
| 2,742,158 | 4/1956 | Schuller | 210/75 X |
| 2,855,100 | 10/1958 | Findlay | 210/415 X |
| 2,862,622 | 12/1958 | Kircher, Jr. et al. | 210/75 X |
| 2,990,238 | 6/1961 | Kabisch et al. | 210/82 X |
| 3,055,290 | 9/1962 | Arvanitakis | 210/332 X |
| 3,168,033 | 2/1965 | Hansen | 100/116 X |
| 3,214,369 | 10/1965 | Felix | 210/75 X |
| 3,289,839 | 12/1966 | Muller | 210/111 X |
| 3,429,443 | 2/1969 | Stern | 210/456 X |
| 3,478,679 | 11/1969 | Bauserman | 100/117 |
| 3,698,558 | 10/1972 | Weber et al. | 210/256 |
| 3,796,316 | 3/1974 | Matz | 210/332 |
| 3,870,638 | 3/1975 | Karpacheva et al. | 210/456 X |

FOREIGN PATENT DOCUMENTS 780406 7/1957 United Kingdom ............... 210/19

Primary Examiner—Robert H. Spitzer
Attorney, Agent, or Firm—Morgan, Finnegan, Pine, Foley & Lee

[57] ABSTRACT

The present invention relates to a multi-stage, single vessel, purification system for removing solid particles from liquids.

Within the central portion of the vessel is a deceleration chamber having flow control means. About and substantially coextensive with the deceleration chamber is a filtering chamber. Depending well into the filtering chamber are a plurality of septums preferably coated with filter aid. Below the deceleration and filtering chambers is a settling chamber, and beneath the vessel is an expulsion device.

A contaminated liquid is fed into the deceleration chamber and decelerated. In this chamber the lighter solid particles rise to the top of the liquid where they are removed, while the heavier density particles settle downwardly. As the liquid moves downwardly from the deceleration chamber it essentially displaces liquid in the settling chamber upwardly into the filtering chamber. In so doing the change of direction of liquid movement also causes the heavier particles to settle downwardly. Concurrently the rising liquid in the filtering chamber passes through the septums where sufficient quantities of remaining solid contaminates in the liquid are removed to provide purified liquid ready for reuse or discharge.

The solid contaminates settling downwardly from the deceleration and filtering chambers and through the settling chamber are received by the expulsion device which removes residue liquid and compacts the solid contaminate.

Without disassembling the vessel the filter aid and contaminate on the septums are removed when necessary by hydroshock or hydropulsating means and the septums are provided with a fresh coating of filter aid.

19 Claims, 21 Drawing Figures

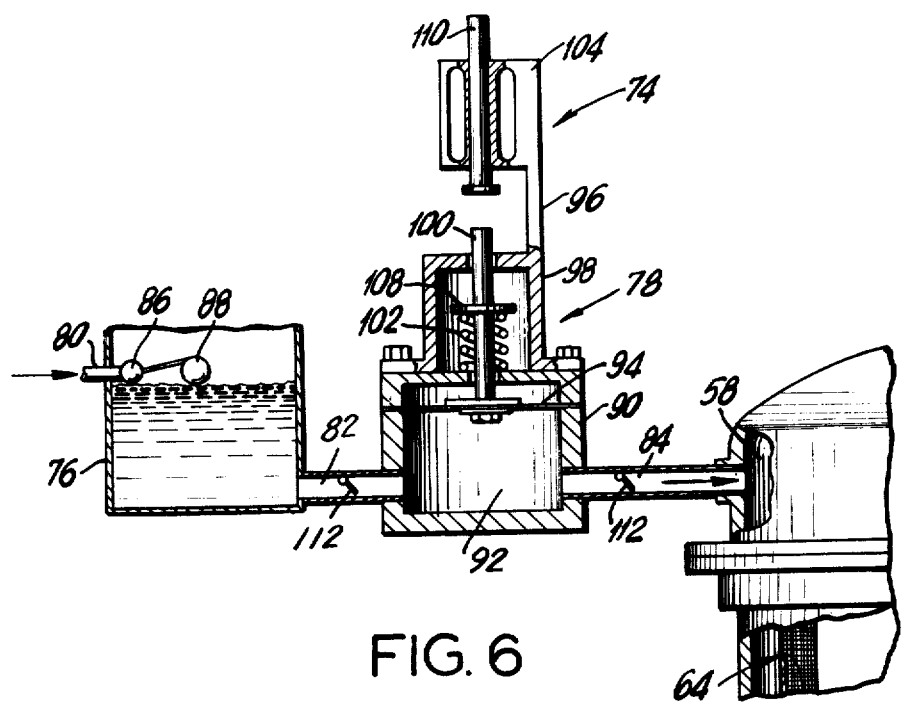
FIG. 6
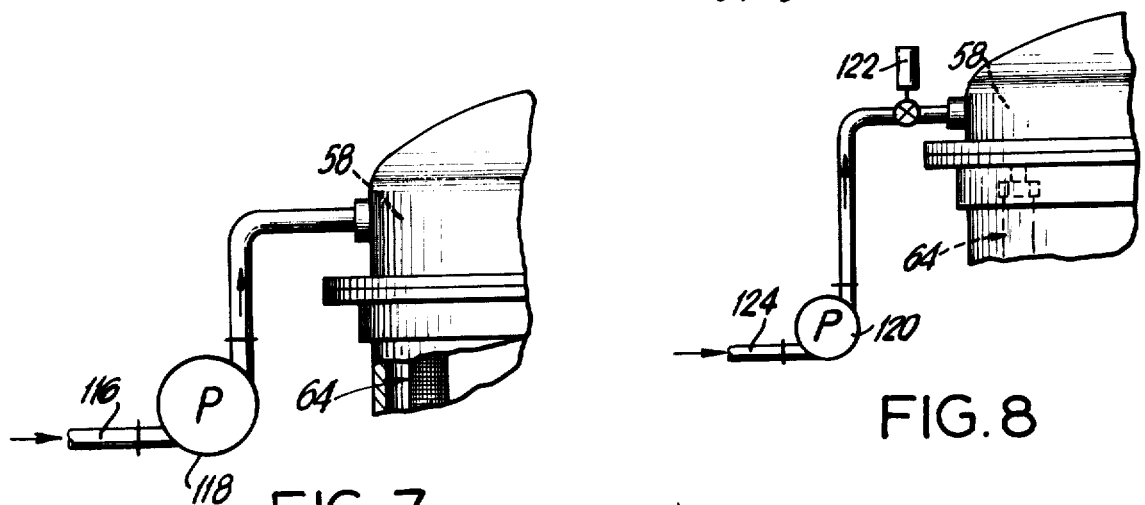
FIG. 7
FIG. 8
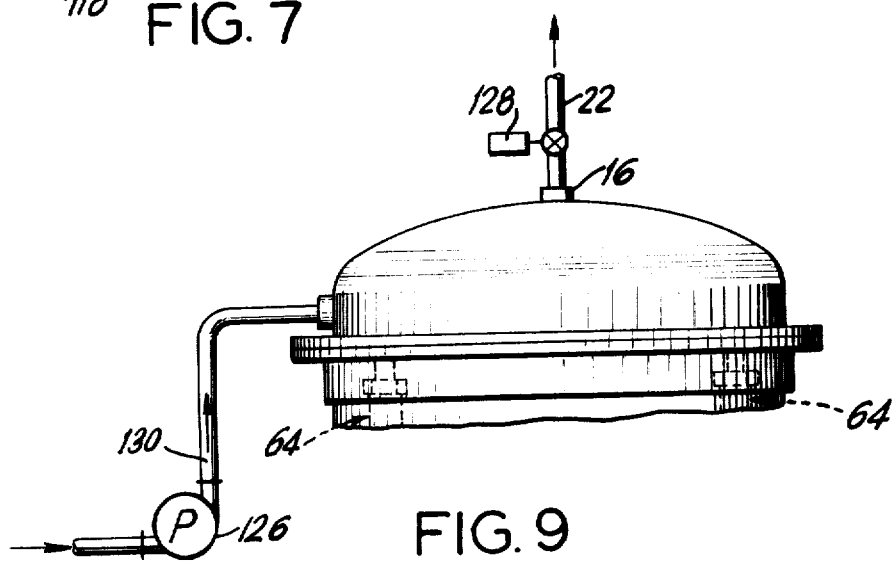
FIG. 9

MULTI-STAGE PURIFICATION SYSTEM

This application is a continuation-in-part application of Ser. No. 736,550, filed Oct. 28, 1976, now abandoned, which, in turn, is a continuation application of Ser. No. 411,248, filed Oct. 31, 1973, now abandoned.

FIELD OF THE INVENTION

This invention relates to removing contaminates from liquids so that the purified liquid can be used, reclaimed, recycled or discharged into streams, rivers and the like. More particularly, the present invention relates to a multi-stage, single vessel, purification system for removing solid particles from liquids.

BACKGROUND OF THE INVENTION

The use and preservation of our resources continues to present conflicting priorities. On the one hand there is the municipal, industrial, commercial, marine and residential priority of growth. However, this priority has resulted in the dumping or discharging of contaminated liquids into our waters, streams and rivers. Contaminated industrial effluents from textile and paper processes, and sewage waste of municipalities and residence are typical examples. On the other hand the priority of preserving and conserving of resources cannot be left unchecked. The costs and complexities involved in trying to preserve and conserve our resources have escalated to a point where waste removal by pollution devices and systems is stifling municipal, industrial, commercial, marine, residential growth. Clearly, a balance between progress and conservation must be achieved.

In addition, there are a number of instances where relatively clean liquids must be further purified or refined before use. Typically, there are a number of industrial processes which use water that must be particularly free of solid contaminate. For example, the water used in jet looms for weaving must be clean to avoid clogging of the jets. Thus, there also is a need for refined or especially clean liquids.

The purification systems of our earlier patents, U.S. Pat. Nos. 3,698,558 of Oct. 17, 1972 and 3,887,470 of June 3, 1975 are directed to achieving the foregoing balance between growth and conservation, as well as to providing especially purified or refined liquids when necessary.

In the present invention there is provided a new and improved system which achieves the desired goals of balancing the use of our resources with their preservation, and of providing particularly purified liquid where necessary.

It is, therefore, an object of the present invention, to provide a new and improved purification system which removes solid contaminates from liquids so that the purified liquid can be reclaimed, recycled, used or discharged into streams, rivers and the like.

Another object of the present invention is to provide a purification system which is useful for municipal, industrial, commercial, marine and residential needs.

Still another object of the present invention is to provide a purification system which provides a multi-stage system in a compact, sigle vessel.

A further object of the invention is to provide a relatively inexpensive, fully automatic, easy to operate purification system.

Another object of the present invention is to provide a purification system useful in processes where especially purified liquids are required.

A still further object of the present invention is to salvage the solid contaminates for by-product use, sale, or for easy disposal.

SUMMARY OF THE INVENTION

The objects of the invention, are, in general, accomplished by removing contaminates from liquid in the following multi-stage, single vessel, system.

In the initial stage or zone, the liquid is decelerated to allow the light or low density particles to float upstream to the top of liquids where they are removed, while the heavier density particles are allowed to settle within the decelerated liquid in a downstream direction.

Downstream of the deceleration zone is a directional stage or zone. Here the decelerated liquid with the downwardly settling particles are moved into an extended static column of liquid which forms a barrier between the deceleration stage and a later stage where the settled solid contaminates are removed. In this, the directional zone, the liquid being displaced in the static column reverses the direction of movement of liquid from the deceleration into a third and filtering stage. In so doing the change of direction of movement of the liquid induces settlement of contaminate therein. Accordingly, the heavier solid contaminate from the liquid which changes direction of movement as well as the heavier solid contaminate from the deceleration stage, settle in a downstream direction.

Upstream of the deceleration stage is a filtering zone. The liquid from the deceleration zone displaces liquid upstream about the deceleration stage where it is filtered. This stage removes sufficient quantities of remaining solid contaminates in the liquid to provide purified liquid ready for reuse or discharge.

In the removal stage downstream of the foregoing stages, the contaminates which have settled in the downstream direction are discharged and segregated and compacted.

In a preferred embodiment of the invention, the multistage, single system includes a vertically upright, essentially hollow tank having an inlet conduit extending through the top thereof. Within the tank there is a cylindrical tube which forms a deceleration chamber and into which the incoming liquid is fed through the inlet conduit. The breadth of the chamber is substantially greater than the breadth of the inlet so that the incoming liquid is decelerated. Within the deceleration chamber there are deflecting and diffusing means. The deflecting means direct the flow of incoming liquid outwardly to the cylindrical tube where the diffusing means breaks up flow and prevents streaming (turbulence) or short circuiting (missing stages of the process), and induces the heavier solid contaminate to settle downwardly while inducing the lighter solid contaminate to float upwardly to the top of the liquid where it can be removed.

At the downstream or lower end of the cylindrical tube are flow control means. Here liquid from the deceleration chamber moves into the extended static column of liquid which forms the barrier between the deceleration chamber and the later stage where solid contaminates are removed. The flow control means facilitates the changing of direction of movement of liquid from the deceleration chamber with limited flow disturbances to the liquid. It is at this stage that the solid contaminate from the deceleration chamber and the heavier solid contaminates in the liquid changing direction, settle downwardly through the tank.

About the cylindrical tube is an annular filtering chamber into which liquid moves upwardly about the tube. Depending into the annular chamber are filtering means. In the preferred embodiment the filtering means include a plurality of septums spaced about in a suspended manner within the annular chamber wherein each septum is coated with a filter aid. The effluent in the annular filtering chamber moves through the septums which remove solid contaminate and allows only purified liquid to pass thereinto.

Above the septums is a liquid chamber open to the interior of the septums and into which the filtered, purified, liquid passes. From this liquid chamber the purified liquid is fed from the tank ready for use or discharge.

Below the deceleration chamber and within the tank, there is maintained a static column of the liquid to allow solids to settle downwardly. At the bottom of the tank is an outlet for the discharge of solid contaminate into a compactor which removes residue liquids and compacts the solids for salvage or disposal. Preferably the compactor includes an ejector which includes piston means used in compacting the solid contaminates while expressing residue liquid therefrom so that the ejected, compacted solids are easy to handle.

In the embodiment where the septums have coatings of filter aid thereon, means, such as hydroshock or hydropulsating devices are connected to the tank to deliver forces through and to the liquid in the tank. Without opening or dismantling the tank, such devices can deliver hydroshock or pulsating liquid to the septums which causes removal of the filter aid. After removal the filter aid will settle to the bottom of the tank. A new charge is then added within the tank which accumulates on the cleansed septums in the form of fresh coatings. These coatings form microscopic channels which filter contaminates from the liquid.

BRIEF DESCRIPTION OF THE DRAWINGS

The following is a detailed description together with accompanying drawings of a preferred embodiment of the invention. It is to be understood that the invention is capable of modification and variation apparent to those skilled in the art within the spirit and scope of the invention.

In the drawings:

FIGS. 5A-C are detailed views of a portion of a septum shown in FIG. 1, wherein FIG. 5A illustrates the coating of a septum with the filter aid; FIG. 5B illustrates the filtering effluent through the coated septum; FIG. 5C illustrates the removal of the filter coating and contaminate from the septum, readying the septum for a fresh coating.

FIG. 6 is a schematic view of one embodiment of the means for removing the filter coating and contaminate from the septums, wherein the illustrated means is a hydroshock device.

FIG. 7 is a schematic view illustrating a hydropulsating device for removing filter coating and contaminate from the septums.

FIG. 8 is a schematic view illustrating the combination of a pump and an upstream pulsating valve for removing the filter coating and contaminate from the septums.

FIG. 9 is a schematic view illustrating the combination of a pump and a downstream pulsating valve for removing filter coating and contaminate from the septums.

OVER ALL

Figure 1:
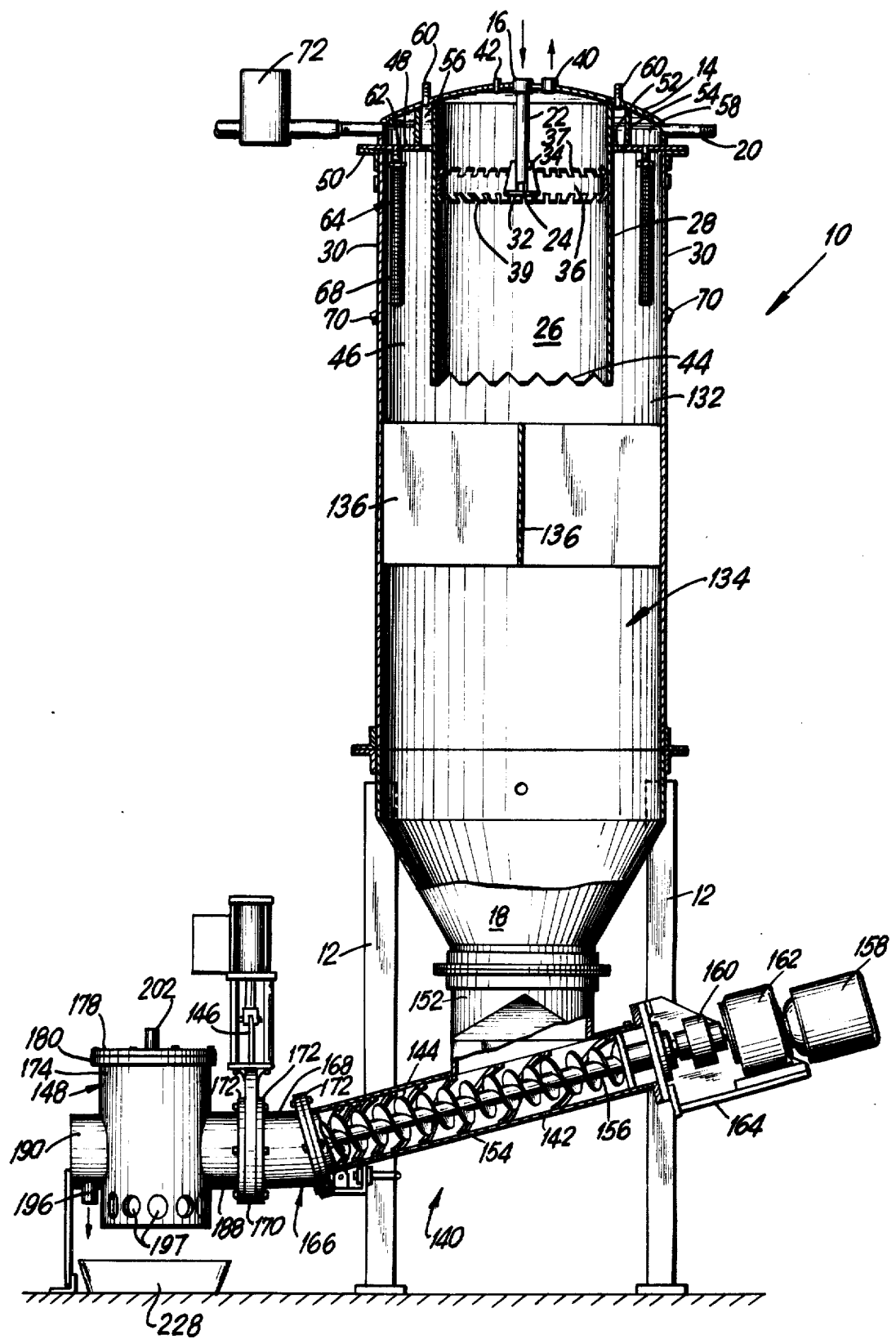
FIG. 1 is a longitudinal view, partly in section, of a preferred embodiment of the multi-stage, single vessel system of the present invention.

Referring to the drawings and first to FIG. 1, there is illustrated a vertically extending, multi-stage, single vessel 10 of the invention supported in its upright position by a stand 12.

The vessel or tank 10 has a removable cover 14 of concentric shape which includes a centrally positioned inlet 16 for receiving liquid containing solids and other waste materials. At the bottom of the tank 10 is an outlet 18 for the discharge of solids and other waste materials which have been removed from the liquid. Between the liquid inlet 16 and waste outlet 18, and within the tank 10, the solids and other wastes are removed from the liquid as hereinafter explained in detail, and purified liquid is discharged from an outlet 20 which extends through one side of the cover 14.

FIRST STAGE

Figure 2:
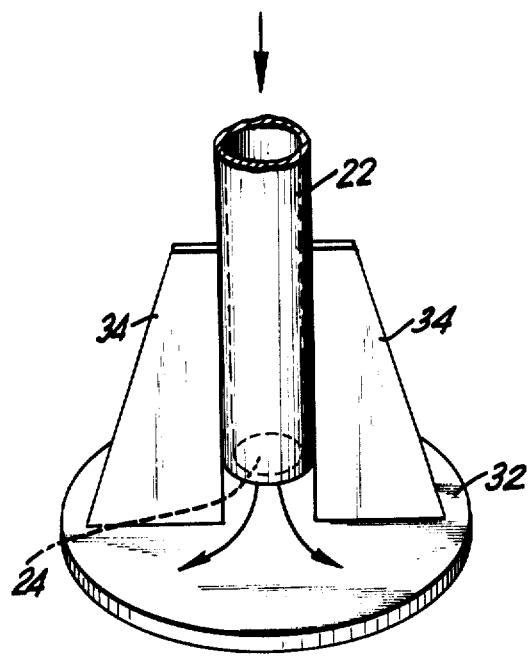
FIG. 2 is an enlarged perspective view of the portion of the inlet conduit and deflector means positioned within the deceleration chamber which radially deflects the incoming liquid.
Figure 3:
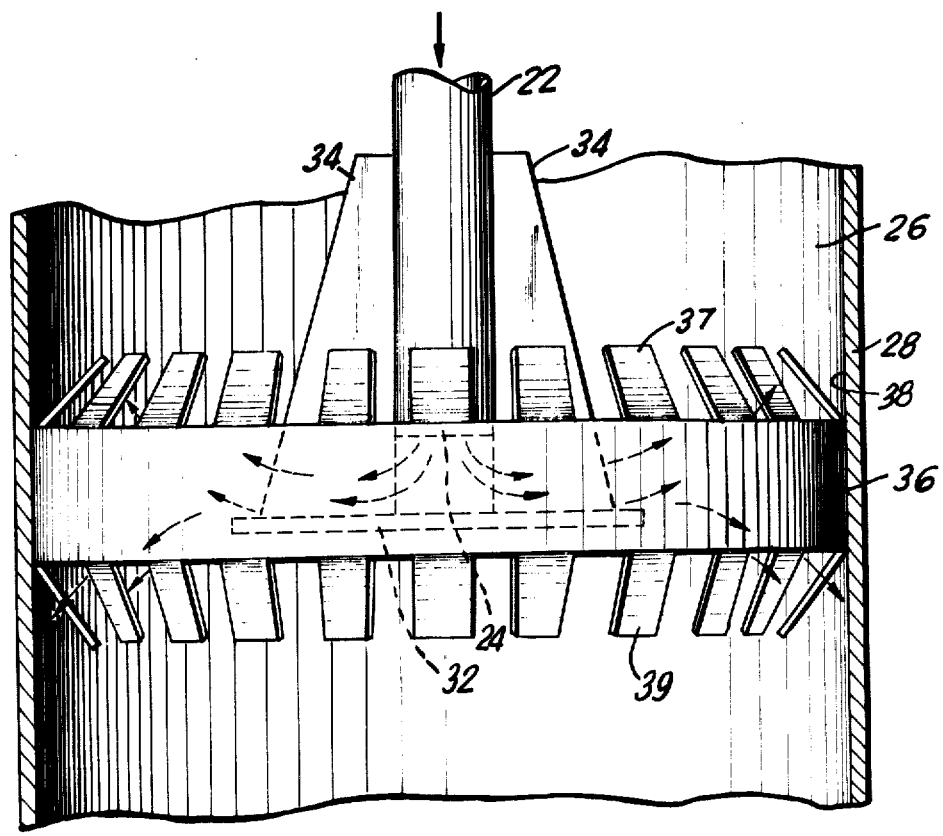
FIG. 3 is an enlarged longitudinal view, partly in section, which illustrates the combination of the deflector and diffuser means within the deceleration chamber.

Extending through the inlet 16 is a depending inlet conduit 22. As shown in FIGS. 1–3 the inlet conduit 22 is a cylindrical pipe which extends downwardly and opens at its outlet end 24 into the upper portion of a deceleration chamber 26.

The chamber 26 is formed by a cylindrical tube 28 which is secured to and extends downwardly from the cover 14 about the inlet conduit 22 and into the central portion of the tank 10. The cylindrical tube 28 forms an annular wall which is spaced inwardly from the annular outer wall 30 of the intermediate portion of the tank 10.

Depending from and spaced from the inlet conduit 22 is a horizontal baffle plate 32 fixed in position by vertical supports 34. The upper portion of each support 34 is secured to the outlet end 24 of the conduit 22 and the bottom of each support 34 is secured to the baffle plate 32.

About the outlet end 24 of the conduit 22 and baffle plate 32, and in the path of flow from the conduit 22, is a diffusor 36. As shown, the diffusor 36 includes a thin strip of sheet steel circumscribing and attached to the inner surface 38 of the tube 28. The upper and lower sections 37 and 39 of the diffusor 36 are contoured inwardly toward the center of the chamber 26 and are scalloped.

The flow of liquid from the conduit 22 is downwardly against the baffle plate 32 and then radially outward toward and into the diffusor 36. By virtue of its shape and contour the diffusor 36 quiets liquid flow, directing medium and heavier density solid contaminating particles in the liquid downwardly, and directing the lighter or low density solid contaminated particles in the liquid upwardly.

Within the cover 14 and adjacent one side of the liquid inlet 16 is a contaminate outlet 40 for removal of the lighter or low density solid particles as they rise and float to the top of the liquid within diffusion chamber 26. On the opposite side of the liquid inlet 16, a vent 42 is provided for gases which rise up through the liquid in the deceleration chamber 26.

As part of start up the tank 10 is filled with contaminated liquid so that the liquid level is at outlet 40 and the inlet conduit 22 is submerged within the liquid.

In this the first stage the flow of liquid is diffused rapidly in an expanding manner from the relatively small inlet conduit 22 to the considerably larger deceleration chamber 26 already filled with liquid. In doing so, the velocity of the liquid is decreased significantly causing the lighter density particles in the liquid to be released and float upwardly, and to flow with liquid through the outlet 40.

Also, by feeding the liquid from a conduit 22 immersed in liquid, the liquid within the tank 10 provides an essentially constant pressure for moving liquid through the stages of the system and assists in compaction of the discharged contaminate, as hereinafter described. Further, by diffusing liquid into liquid air is prevented from being introduced into the liquid which can cause erratic fluid flow that may adversely affect the coated septums, hereinafter described.

SECOND STAGE

While the lighter density particles float upwardly within the liquid, the heavier density particles in the liquid are allowed to settle downwardly through the deceleration chamber 26.

As stated previously, the centrally positioned cylindrical tube 28 forms the chamber 26 and extends downwardly into the central portion of the tank 10 where it terminates. As shown in FIG. 1 the lower portion of terminus of the tube 28 includes interrupting means 44 which minimize liquid flow while facilitating the movement of liquid from the chamber 26 and about the tube 28. In this illustrative embodiment, the tube 28 terminates in an annular scallop or saw tooth configuration.

In this stage the liquid is decelerated rapidly causing the heavier contaminate particles to settle downwardly as the liquid moves downwardly through the deceleration chamber 26. Below the deceleration chamber 26 is a column of static liquid within the filled tank 10 which forms a liquid barrier. As the liquid leaves the terminus 44 of the chamber 26, the liquid being displaced in the static column reverses the direction of movement of liquid outwardly and upwardly into a filtering chamber, hereinafter described. This causes the heavier particles in the liquid changing direction of movement, as well as the heavier particles descending from the liquid within the chamber 26, settle downwardly toward the tank outlet 18.

Figure 4:
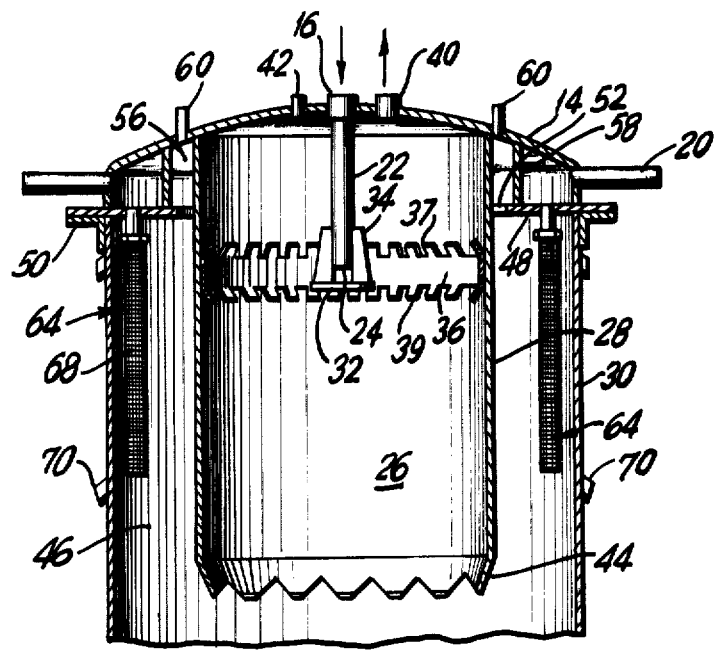
FIG. 4 is a longitudinal view, partly in section, of another embodiment of the tubular means forming the deceleration chamber wherein said means includes an inwardly tapered terminus.

In the embodiment of the invention shown in FIG. 4 the cylindrical tube 28 includes an inwardly flared fluid control means having a saw tooth configuration at its terminus 44. The inward flaring is sufficient to cause liquid moving from the deceleration chamber 26 to accelerate, which, in turn, causes liquid between the tank wall 30 and the tube 28 to move upwardly to the septums, hereinafter described. At the same time the flare is not so great as to cause excessive turbulence of the liquid at the terminus 44 of the wall 30. It has been found, for example, that an inward flare of about 30 degrees is satisfactory.

The benefits of the flaring are twofold: first, this type of upward liquid displacement does not adversely disturb the filtering operation hereinafter described; and second, a more rapid settling of solid particles from the liquid leaving the deceleration chamber 26 is effected because of the increase in velocity of movement of the exiting liquid and the increased change in flow direction due to the angle of the terminus 44.

THIRD STAGE

About the deceleration chamber 26 is an annular filtering chamber 46 which is formed between the tube 28 and tank wall 30.

At the upper end of the annular filtering chamber 46, and between the concentrically shaped removable cover 14, is a horizontal annular plate 48. The plate 48 extends outwardly from the tank 10 and cover 14 where it is mounted on an annular flange 50 secured to the outer surface of the tank wall 30. The plate 48 includes a central opening 52 through which the cylindrical tube 28 extends. Within the space between the tube 28, plate 48 and cover 14, there is a vertical annular ring 54 which divides such space into two chambers 56 and 58.

The inner chamber 56 serves as a low density chamber and is formed by the cover 14, tub 28, plate 48, and ring or wall 54. As shown in FIG. 1, there is substantial clearance between the tube 28 and the periphery of the plate 48. This clearance forms an annular opening 52 which connects the low density chamber 56 with the filtering chamber 46. Extending through the cover 14 there are a pair of overflow pipes 60. which form conduit for removing low density solid particles.

The outer chamber 58 serves as a purified liquid chamber and is formed by the cover 14, plate 48 and wall 54. Extending through the plate 48 are a plurality of bores 62 circularly arranged and equai-spaced from one another. The bores 62 connect the purified liquid chamber 58 with the annular filtering chamber 46. Extending into the purified liquid chamber 58 is the outlet conduit 20 for removing the purified liquid.

Extending into each bore 62 and depending from the plate 48 well into the annular chamber 46 are a plurality of porous septums 64. In an illustrative embodiment of the invention there are 20 septums 64 which are removably threaded into the bores 62 and which are circularly arranged and equi-spaced within the chamber 46.

The porous septums 64 of the invention are typically tubular in cross section, and have a closed bottom and a hollow interior. As shown, the porous tubular septums 64 are elongated and extend from the plate 48 to about the lower portion of the filtering chamber, to thereby provide a substantial filtering surface. Illustratively, the porous septums 64 can be formed from screen mesh, stacked washers, porous (sintered) stainless steel or porous plastic.

Figure 5A:
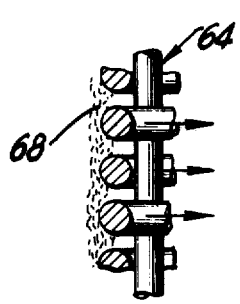

Upon each porous septum 64 there is deposited a filter aid 68 which may comprise diatomaceous earth or fullers earth, or other cellular or fiberous filter aids, or if desired, a powdered material of the same chemical composition as the solids being filtered in a particular application. As shown in FIG. 5A the filter aid bridges the opening in the porous septum 64 and builds up a coating 68 of filter cake. The cake is sufficiently porous as to function as a filtering medium without excessively restricting liquid flow.

At this point of the system the liquid has moved downwardly out of the deceleration chambers 26, and the static column of effluent below the chamber 26 reverses the direction of liquid movement upwardly into the annular filter chamber 46.

Figure 5B:
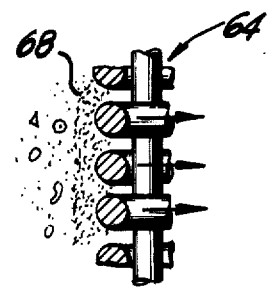
Figure 5C:
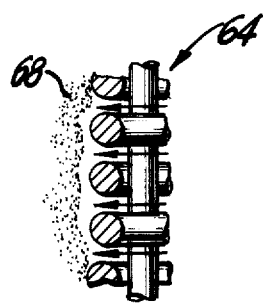

In this stage the liquid moves upwardly and toward the septums 64. As shown in FIGS. 5A and 5B, as the liquid passes through the septums 64 the filter coating 68 provides innumerable microscopic channels which entrap particles suspended in the liquid while allowing the clear liquid to pass therethrough without clogging the septums 64.

The filtered and clear liquid then flows upwardly through the porous septums 64 and the bores 62 into the filtered liquid chamber 58 and then through the outlet conduit 20 ready for use or discharge.

At the same time liquid in the filter chamber 46 can flow through the annular opening 52 into the chamber 56 where the light particles rise to the top of the chamber 56 and can be removed. As required, the liquid in the chamber 56 can be removed and recycled back into the tank 10 or to a source for removal of remaining liquid.

Pre Coating And Cleaning Septums

In this stage the filter aid can be added or removed without disassembling the system.

To provide the coating 68 of filter aid to the septums 64, there is provided upwardly directed inlets 70 in the tank wall 30 at the level of the bottom of the septums 64. In use, required amounts of filter aid are fed through the inlets 70 into the liquid in the tank 10. The filter aid rises to the septum 64 and forms the coating thereon.

After the initial coating small amounts of filter aid can be fed into the tank 10 as filtering progresses. The filter aid is mixed with the liquid and will be deposited on the existing coating 68 on the septums 64. By this technique a new filtering surface can be continuously formed.

To remove the coating 68 from the septums 64 due to the collection of contaminate thereon, there is provided hydroshock or hydropulsating means 72 which deliver forces within the septums 64 so as to cause the filter aid to separate therefrom. The separated filter aid then is allowed to settle to the bottom of the tank 10 and a fresh coating can be applied to the septums 64.

In the embodiment shown in FIG. 6 there is shown a hydroshock device 74.

The device 74 includes a water reservoir 76 for providing water for the device 74, a hydroshock mechanism 78 for affecting hydrodynamic shocks, and interconnecting conduits 80, 82 and 84 for connecting the reservoir 76 to a water source (not shown) and to the mechanism 78, and for connecting the mechanism 78 to the purified liquid chamber 58 for delivery of the hydrodynamic shock to the interior of the septums 64.

The water source conduit 80 is connected into the upper portion of one end of the reservoir 76. At the point of entry the reservoir has a float control valve 86 which remains open until the level of water is at the desired level as illustrated in FIG. 6. When the water reaches this level the float 88 closes the valve 86.

Intermediate to the reservoir 76 and the tank chamber 58 is the hydroshock mechanism 78 which includes a lower housing 90 which defines a water chamber 92. Conduit 82 is connected into the lower portions of the other end of the reservoir 76 and one end of the chamber 92 for conveying water from the reservoir to the chamber 92. Conduit 84 is connected into the other end of the chamber 92 and into the purified liquid chamber 58.

Extending across the chamber 92, in the upper portion thereof, is a piston actuated diaphragm 94. As shown, the level of water in the reservoir 76 normally is maintained above the level of the diaphragm 94 so as to cause the water in the chamber 92 to act against the diaphragm 94.

Above the chamber 92 and mounted on the housing 90 is a generally U-shaped frame 96. The lower portion 98 of the frame 96 houses a reciprocal piston 100 normally biased by a spring 102 toward the upper portion 104 of the frame 96. The reciprocal piston 100 extends into the water chamber 92 where it is secured to the diaphragm 94 and into the space between the frame portions 98 and 104. Within the lower frame portion 96 the spring 102 is biased between the flange 108 on an intermediate portion of the piston 100 and the top of housing 90.

In the upper portion 104 of the frame 96 is housed a slidable piston actuator which, as shown, is a reciprocal plunger 110 capable of delivering rapid blows to the piston 100. This plunger 110 can be mechanically, electrically, pneumatically or hydraulically operated.

Figure 15:
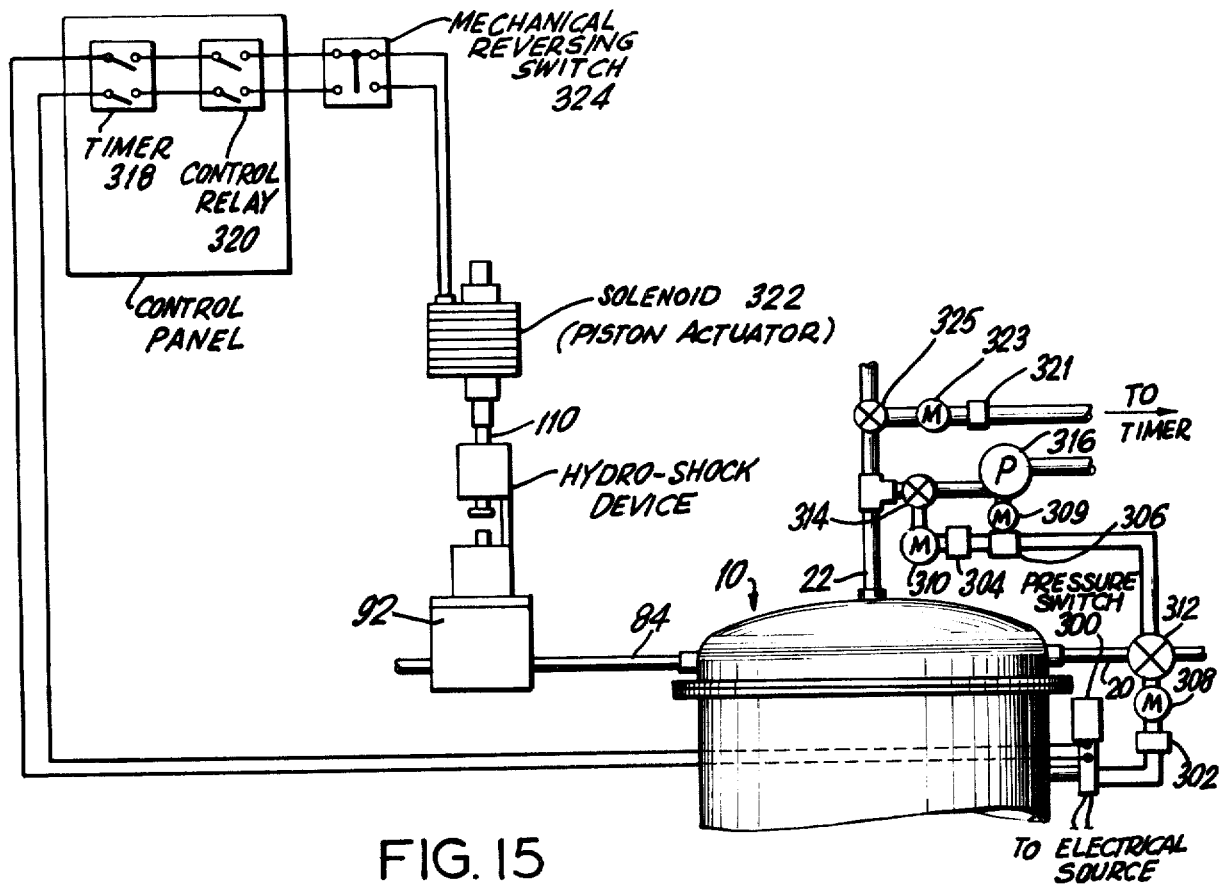
FIG. 15 is a schematic view of an electro-mechanical means for controlling the movement of the hydroshock plunger shown in FIG. 6.

In FIG. 15 there is illustrated an electro-mechanical control means which includes an electrical pressure switch 300 set to a predetermined pressure. As contaminate builds up on the filter coating 68 the pressure from the liquid in the tank 10 increases. When the pressure increase corresponds to contaminate build up which renders the process substantially less efficient, e.g., when the pressure increases from about 2 psi to about 30 psi, the switch 300 closes a circuit which includes relays 302, 304 and 306. These relays activate motors 308, 309 and 310 which close valves 312 and 314 in the conduits 20 and 22 and turn off a pump 316 used in conveying contaminated liquid from the source (not shown) to the tank 10 via the inlet conduit 22.

At the same time the switch 300 closes a circuit having a timer 318 and control relay 320 which energize a hydroshock piston actuator 322, e.g., a solenoid. To create multiple thrusts of the plunger 110 a reversing switch 324 is used to reverse the direction of travel of the actuator 322.

Upon actuation, the plunger 110 delivers several rapid blows to the piston 100. This causes the reciprocating piston 100 to vibrate the diaphragm 94 within the water chamber 92. In turn, the vibrating diaphragm effects a hydrodynamic shock which travels through the water chamber 92, conduit 84 into the purified liquid chamber 58 and into the interior of the septums 64. This shock is sufficient to cause the filter aid coated with contaminate to separate from the septums 64.

Concurrently a relay 321 connected to the timer 318 activates a motor 323 which opens a valve 325 in conduit 22 to allow for displacement of hydroshocked liquid. This liquid is then conveyed through the conduit 22 to a source (not shown).

The separated filter aid and contaminate will settle to the bottom of the tank 10.

In an illustrative embodiment a hydroshock force of 61 psi was sufficient to remove a coating 68 of diatomaceous earth and contaminate from the screen mesh septums 64 without an adverse effect.

To ensure that the flow of water from the hydroshock mechanism 78 is always toward the tank chamber 58, there are provided one way check valves 112 within the conduits 82 and 84.

Once the contaminate and coating 68 are removed the pressure in the tank 10 decreases causing the switch 300 to effect the opening of the valves 312 and 314 and the operation of the pump 316, and to effect the deactivation of the hydroshock mechanism 78.

In FIGS. 7-9 of the accompanying drawings, other embodiments of the filter aid removing means are illustrated.

In FIG. 7 there is a hydropulsating device including a conduit 116 connected at one end to a water source (not shown) and at the other end to the purified liquid chamber 58. Intermediate these ends the conduit 116 is connected to a pulsating pump 118. In operation the pump 118 driven by a motor (not shown) pulsates the water from the water source which is being conveyed to the chamber 58 and the interior of septums 64. The pulsation of the water is sufficient to cause it to remove the filter coating 68 and contaminate from the septums 64.

In FIG. 8 the combination of a pump 120 and an upstream pulsating valve 122 is employed to separate the filter aid and contaminate from the septums 64. In use water is fed through a conduit 124 from a water source (not shown) to the interior of the septums 64 by the pump 120 while the upstream pulsating valve 122 rapidly opens and closes to pulsate the water flowing into the interior of the septums 64. By so doing, the pulsating water causes the filter aid with contaminate to separate from the septums 64.

Figure 16:
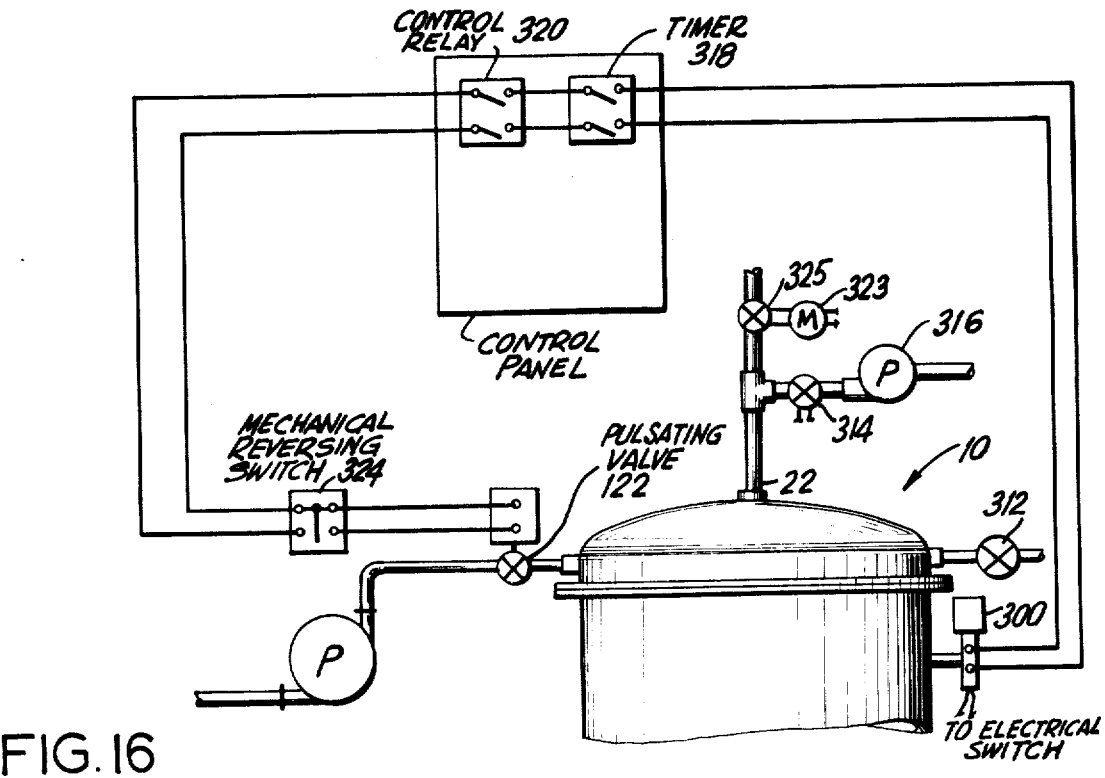
FIG. 16 is a schematic view of an electro-mechanical means for controlling the movement of the pulsating valve shown in FIGS. 8 and 9.

As shown in FIG. 16 the previously described electromechanical control means for the hydroshock mechanism 78 can be used to activate the pulsating valve 122.

In FIG. 9 the combination of a pump 126 and a pulsating valve 128 is again used. In this embodiment the valve 128 is located downstream of the septums 64. As shown the pulsating valve 128 is positioned in the inlet conduit 22. In use the pump 126 feeds water from a source (not shown) through a conduit 130 while the pulsating valve 128 in the inlet 16 rapidly opens and closes, causing the liquid within the tank 10 to pulsate. The pulsation of the liquid within the tank 10, as in the previous embodiment, is sufficient to cause the filter aid and contaminate to separate from the septums 64. Here, however, the pulsations are delivered to the septums 64 externally rather than internally.

In this embodiment the pulsating valve 128 is also driven by the means illustrated in FIG. 16.

It is to be understood that it is within the scope of the invention to provide other means for actuating the hydroshock plunger 110 and pulsating valves 122 and 128. The hydroshock and hydropulsating mechanism of the invention can be operated by mechanical, electrical, pneumatic and hydraulic means or by a combination of such means.

Fourth Stage

Within the tank 10 and immediately below the deceleration chamber 26 and filtering chamber 46 is a settling chamber 134. The settling chamber 134 extends across the breadth of the tank 10 and extends from the chambers 26 and 46 to the tank outlet 18.

The settling chamber 134 includes a free fall zone 132 immediately below the chambers 26 and 46 and baffles 136 immediately below the zone 132 for transforming the column of liquid therewithin essentially into a static column of liquid.

In the illustrative embodiment there are four 90° intersecting baffles 136. When desired, such as in larger units, there are provided additional intersecting baffles to provide a honey comb structure for effecting the essentially static column of liquid.

In this stage the liquid is further decelerated and essentially becomes a static column of liquid. From the static column the solid particles settle downwardly to the tank outlet 18.

Fifth Stage

Below the tank 10 and open to its outlet 18 is an expulsion device 140. This device 140 receives slurry containing solid contaminate and residue liquids from the bottom of the tank 18, and removes the residue liquids and compacts the solids ready for salvage, by-product use, easy disposal and the like.

In general, the expulsion device 140 includes:

a housing 142 with a screw 144 which receives, compacts and transmits the slurry, a valve 146 for controlling the movement of the slurry from the housing 142, an ejector 148 which receives the slurry from the screw 144 and removes residue liquid and compacts the solid comtaminates, and control means 400 (illustrated in FIGS. 17 and 18) for proper sequencing and operation of the screw 144, valve 146 and ejector 148.

Housing And Screw

As shown in FIG. 1, the housing 142 is tubular and is inclined downwardly. At its upper portion the housing includes a hopper or transition section 152 secured and open to the tank outlet 18. Lining the inner wall of the housing is a spiral rib 154 of decreasing pitch. In an illustrative embodiment the rib 154 extends into the housing 142 about 0.75 inch, is about 0.125 inch thick and has a pitch of about 2 in the upstream portion which decreases to a pitch of about 0.5 at the downstream or lower portion of the housing 142.

Within the housing 142 is a rotatable drive shaft 156 which is connected to a drive motor 158 through a coupling 160 and gear reducer 162. As shown, the drive unit including the motor 158, gear reducer 162 and coupling 160 are mounted on a bracket 164 secured to the stand 12. On the shaft 156 within the housing 142 is mounted the helical screw 144.

The housing 142 is always open to the tank outlet 18. From the tank outlet 18 a slurry of residual liquid and solid contaminates moves downwardly into the housing 142 where the rotating helical screw 144 receives, compacts and transmits the slurry downstream to the lower portion of the housing 142. In so doing the ribs 154 of decreasing pitch facilitate transmission and compacting.

Figure 10:
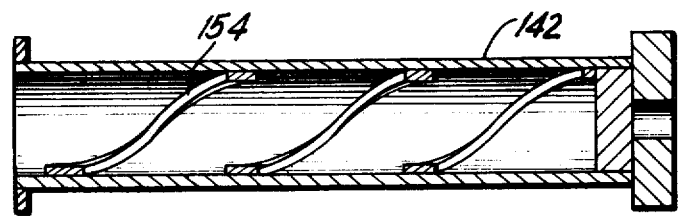
FIG. 10 is a longitudinal view, partly in section, of the housing for the screw press wherein the rib in the housing is in the form of a spiral having a constant pitch.

In another embodiment of the housing 142 shown in FIG. 10, there is shown a spiral rib 154 which has a helical configuration of constant pitch. In still another embodiment a plurality of longitudinal straight ribs spaced apart within the housing 142 can be provided (not shown).

In each embodiment the ribs facilitate compacting and transmission of the slurry. The wiping action between the ribs of the various embodiments and the rotating screw 144 also removes or prevents undesirable build up of solid contaminate on the screw 144.

Valve And Transition Section

Figure 11:
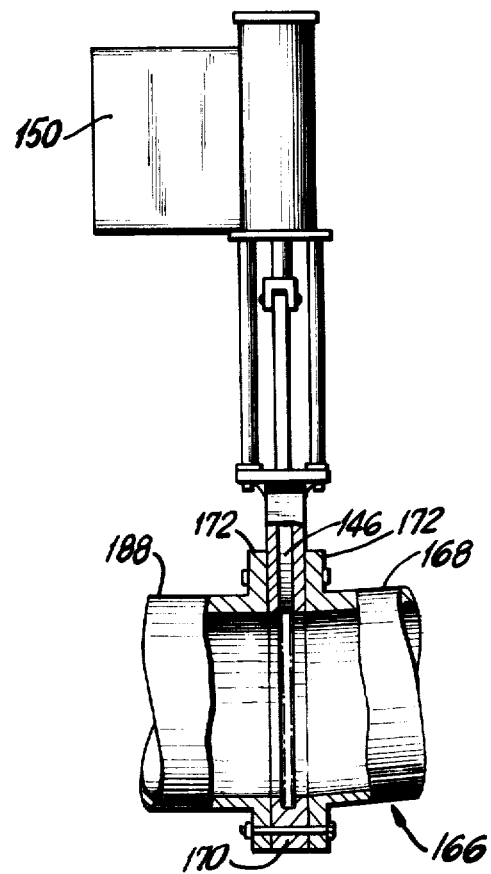
FIG. 11 is a longitudinal view, partly in section, of the gate valve of the expulsion beneath the tank.

Between the housing 142 and ejector 148 is a transition section in the form of a conduit 166 which conveys the slurry downstream from the screw 144 to the ejector 148. In the conduit 166 is the valve 146, which in the illustrative embodiment shown in FIG. 11, is a knife gate valve.

As shown, the conduit 166 includes an elbow 168 and a gate valve housing 170 interconnected to one another and to the housing 142 and ejector 148 by interconnecting flanges 172.

The gate valve 146 is operated by actuator 150 and is opened to allow a charge of slurry to be conveyed into the ejector 148 and is closed to prevent flooding when the ejector 148 discharges the compacted solid contaminate.

Ejector

Referring to FIGS. 1 and 12-14 there are shown three embodiments of the ejector 148. In each embodiment the ejector 148 removes the residue liquid and compacts the solid contaminate.

Double Piston Ejector

Figure 12:
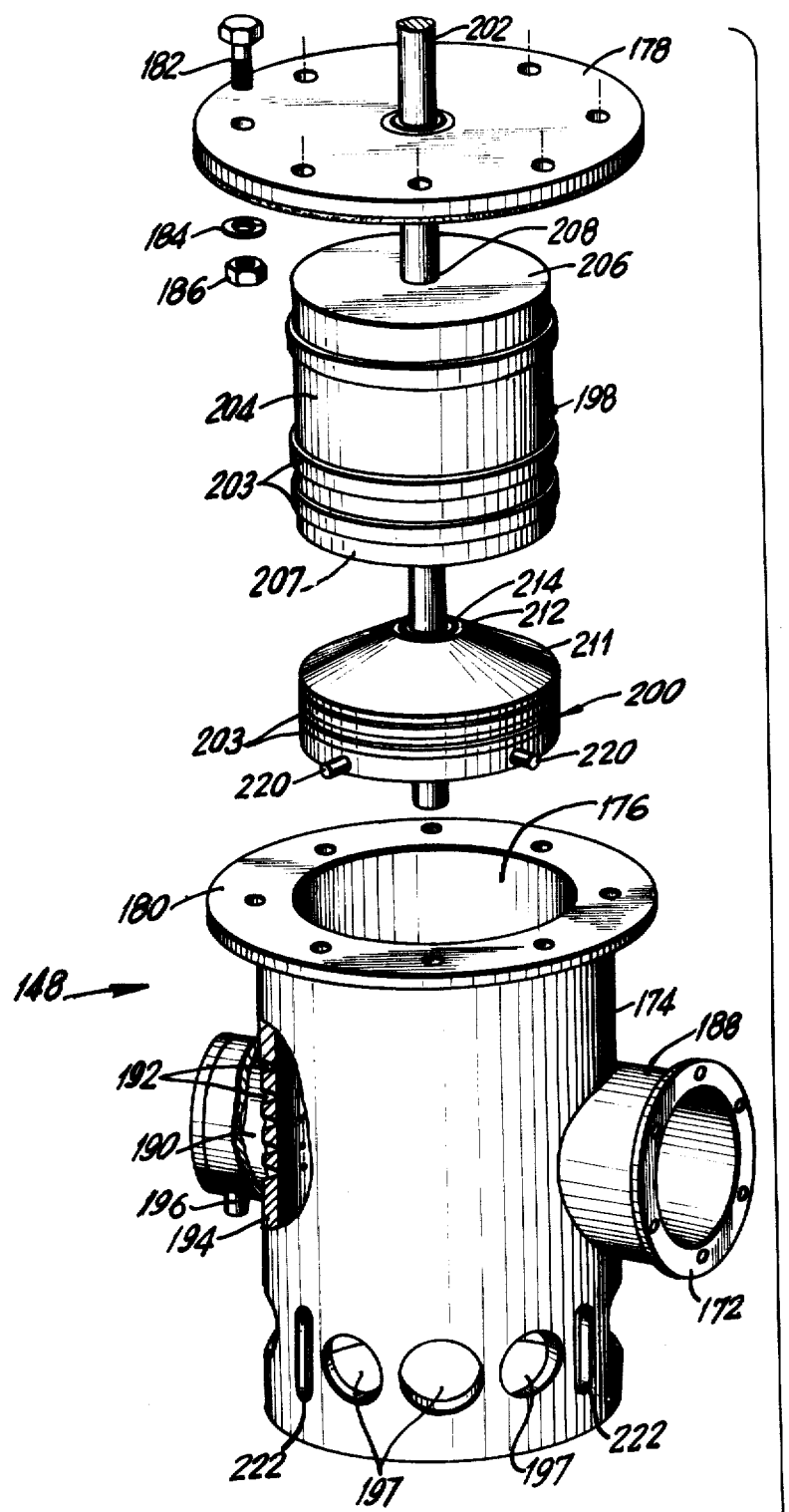
FIG. 12 is an enlarged exploded view of an ejector for the expulsion device, wherein the ejector includes a double piston.
Figure 13:
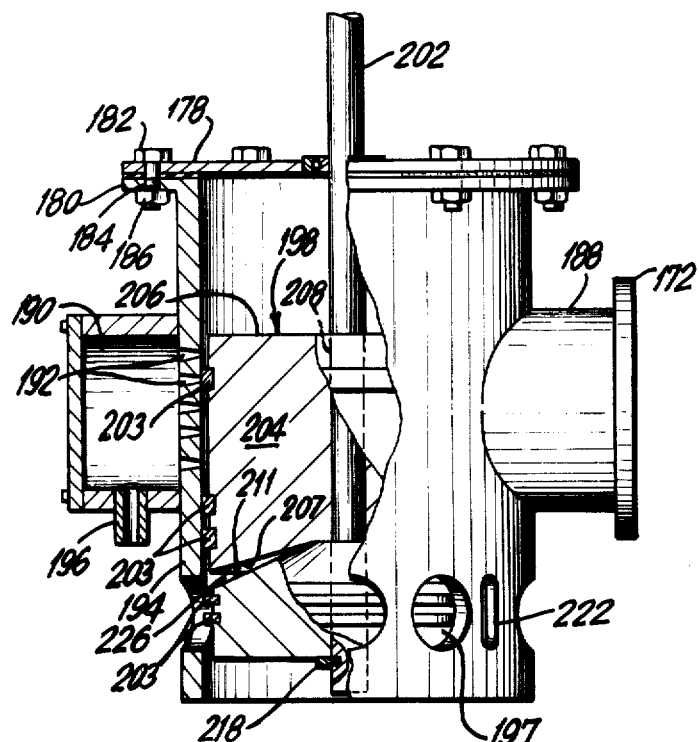
FIG. 13 is a longitudinal view, partly in section, of the assembled double piston ejector of FIG. 12.

Referring first to the preferred embodiment of the ejector 148 shown in FIGS. 1 and 12-13, there is shown a double piston ejector which includes a cylindrical housing 174 having a vertical chamber 176. The chamber 176 is open at the bottom and closed at the top by a cover plate 178 secured to a flange 180 about the upper portion of the housing 174 by screws 182, split washers 184 and nuts 186.

The ejector housing 174 includes an inlet 188 connected to the downstream side of the conduit 166 for receiving slurry transmitted from the screw 144, and a chamber 190 for receiving liquid residue. The chamber 190 is connected to the housing chamber 174 through inverted bores 192 in a common wall 194 therebetween. Depending from the liquid residue chamber is a port 196 through which residual liquid is removed. Extending through and about the lower portion of the housing 174 are ports 197 for discharging compacted solid contaminate.

Within the housing chamber 176 are two reciprocal pistons 198 and 200 mounted on a common piston rod 202. About the pistons 198 and 200 are rings 203 which slidably engage the inside wall of the housing 174.

The upper piston 198 is secured to and moves with the piston rod 202, and includes a cylindrical tube 204 having a head 206 welded thereto. The piston 198 has a central bore 208 through which the piston rod 202 extends, and to which the upper piston 198 is secured. The lower surface 207 of the piston head 198 is generally concave having an inverted dish-like configuration. In an illustrative embodiment the downwardly outer tapered segments form an angle of about 15° to a horizontal control segment.

The lower piston 200 is slidably mounted on the piston rod 202 and in a downward direction can move or float relative thereto. The lower piston 200 has a fustroconical shape with a generally convex surface 211. In an illustrative embodiment the outer tapered downwardly inclined segments form an angle of about 20° to a horizontal central segment. Extending through the piston 200 is a central bore 212 which receives a sleeve bearing 214 bore 212 through which the rod 202 can freely move in a downward direction. In an upward direction a retainer washer 218 secured to the rod 202 limits upward relative movement between the piston 200 and rod 202.

Furthermore, the lower piston 200 is restricted in its travel by virtue of a plurality of guide pins 220 which protrude outwardly and slidably extend through a corresponding member of vertical slots 222 spaced about in the lower portion of the housing 174 between the discharge ports 197.

The opposing, facing surfaces 207 and 211 of each piston 198 and 200 generally define a channel 226 therebetween. As shown, the outer portion of the channel 226 is larger than its inner portion. In the illustrative embodiment when the horizontal middle segments of piston surfaces 207 and 211 contact the outer tapered segments still define the channel 226 because of the differences in the angles therebetween. With such configuration and differing angles the piston surfaces 207 and 211 induce compaction and force the compacted contaminate to their outer periphery.

In the ejector loading position, the channel 226 between the pistons 198 and 200 is open to the inlet 188 and the gate valve 146 is opened. Accordingly, the expulsion screw 144 transmits the slurry through the conduit 166 into the channel 226. When the channel 226 is filled to a predetermined compaction pressure knife gate valve 146 is closed and the piston rod 202 is moved downwardly.

The piston rod 202 moves the upper piston 198 downward with the contaminate sandwiched therebetween which, in turn, moves the lower floating piston 200 in the same direction.

The lower floating piston 200 continues to move downward until the guide pins 220 reach the bottom of the slots 222 between the discharge ports 197. The lower piston 200 is designed to bottom out below the discharge ports 197 while the upper piston 198 continues to move downward compressing the contaminate. By virtue of the opposing concave and convex surfaces 207 and 211 the compressed contaminate is forced outward from the channel 226 through the discharge ports 197 and into receiving means. In the illustrative embodiment a receptacle 228 is placed below the ejector 148. It is to be understood, however, that other receiving means, such as a conveyor, can be used.

The liquid residue which occurs during compression seeps out of the housing chamber 176 through the inverted bores 192 into the residue chamber 190 and through the outlet port 196 where the residue liquid can be recycled back to the tank 10 or conveyed to a source for further processing.

Upon completion of the cycle the piston rod 202 moves the pistons 198 and 200 upwardly to the loading position, and the gate valve 144 is opened ready for the next cycle.

Figure 17:
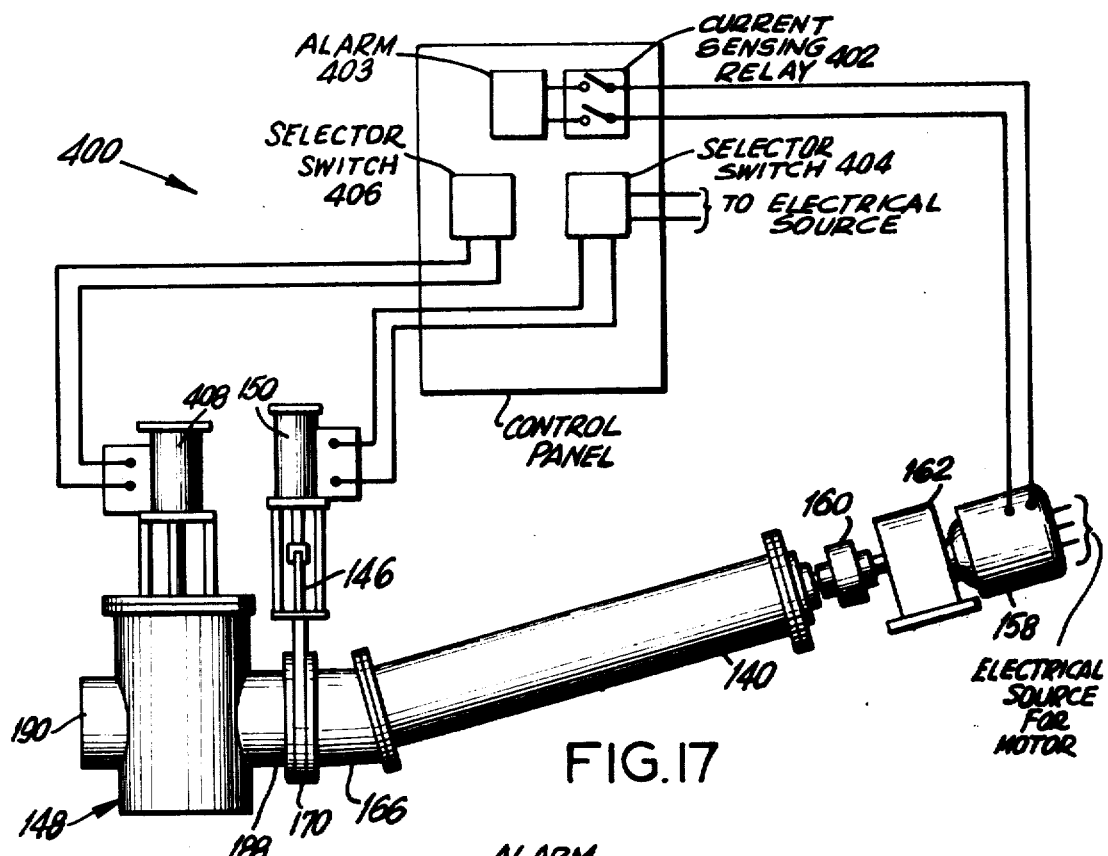
FIG. 17 is a schematic view of an electro mechanical means for controlling the double piston and gate valve of the ejector shown in FIGS. 1 and 11–13.

Referring now to FIG. 17, there is shown an embodiment of the control means 400 for proper sequencing and operation of the screw 144, valve 146 and the double piston ejector 148.

The illustrative electrical control means 400 includes a current sensing relay 402 connected to the motor 158 which drives the screw 144. As the screw 144 compacts the solid contaminates the strain on the screw 144 increases. This increase requires an increase in amperage to the motor 158 for driving the screw 144. When the current increases to a predetermined value, e.g., from about 3 amps to about 5 amps, the current sensing relay 402 closes. This sets off an alarm 403. An operator then moves the three position selector switch 404 from the off position to its forward actuating position connecting a conventional electrical source (not shown) through the switch 404 to the actuator 150. This energizes the actuator 150 to move the gate valve 146 downwardly to its closed position. The operator next moves the three position selector switch 406 from the off position to the forward actuating position connecting a conventional electrical source (not shown) through the switch 406 to the actuator 408. This energizes the actuator 408 to move the pistons 198 and 200 downwardly to compact and eject contaminate.

When the pistons 198 and 200 have reached their lower positions, the operator moves the selector switch 406 to its reverse actuating position, thereby reversing the direction of current through the actuator 408 to raise the pistons 198 and 200 to their upper position.

Next the operator moves the three position selector switch to its reverse actuating position, thereby reversing the direction of current through the valve actuator 150 to raise the valve 146 to its upper or open position.

The control means 400 now is ready to repeat the described cycle, or be turned off if desired. This control means 400 can be fully automated, electrically, pneumatically, hydraulically or by a combination of any such means.

Single Piston Ejector

Figure 14:
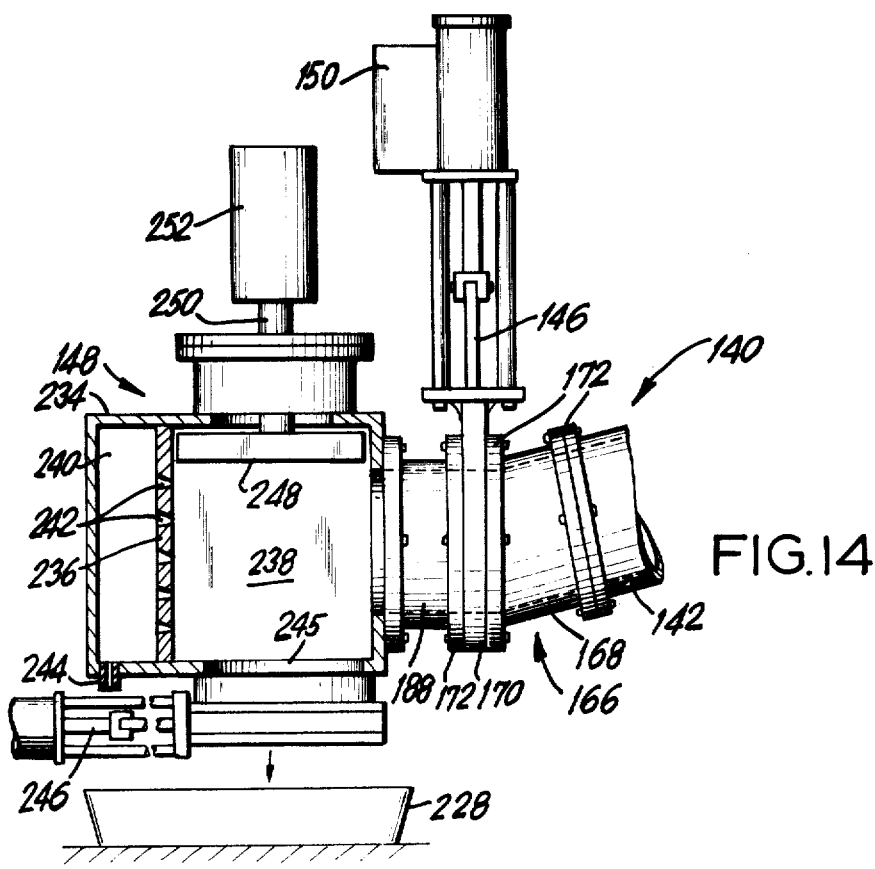
FIG. 14 is a longitudinal view, partly in section of another embodiment of the ejector which utilizes a single piston.

In the embodiment shown in FIG. 14 a single piston ejector 148 is used to remove residue liquid from the slurry and compact the solid contaminate.

This ejector 148 includes a hollow housing 234 secured to the gate valve 144. The interior of the housing 234 is divided by a vertical plate 236 into two chambers 238 and 240. The upstream chamber 238 is for compaction and is open to the housing 142 through the interconnecting conduit 166. The downstream chamber 240 is for liquid residue and is open to the compaction chamber 238 through a plurality of inverted bores 242 in the dividing plate 236.

A conduit 244 is connected to the lower end of the liquid residue chamber 240 for conveying liquid residue from the ejector 148. A port 245 extends through the lower end of the compaction chamber 238 for discharging compacted solids from the ejector 148 into the receptacle 228, conveying means (not shown) or the like. A second gate valve 246 is connected to the lower end of the ejector housing 234 for controlling the opening and closing of the discharge port 245 to permit discharge of solid contaminate.

Within the housing 234 is a reciprocating piston 248 which is slidably mounted in the compaction chamber 238. The upper surface of the piston 248 is connected to a rod 250 which extends upwardly into an actuator 252.

In the loading operation the vertical gate valve 146 is opened, the bottom gate valve 246 is closed, and the piston 248 is in its uppermost position. Accordingly, the screw 144 transmits slurry into the ejector compaction chamber 238 through the conduit 166. As the slurry continues to fill the chamber 238, the solids are compacted and the residue liquid is expressed therefrom through the bores 242 into the residue chamber 240 and discharge conduit 244. When compaction reaches a predetermined pressure the vertical gate valve 146 is closed, the bottom gate valve 246 is opened, and the piston 248 is actuated downwardly driving the solid contaminate through the discharge port 245 into the removing means 228.

At the end of the discharge cycle, the piston 248 is lifted to its starting position, the bottom gate valve 246 is closed and the vertical gate valve 146 is opened to allow another charge of slurry to be conveyed into the ejector 148.

Figure 18:
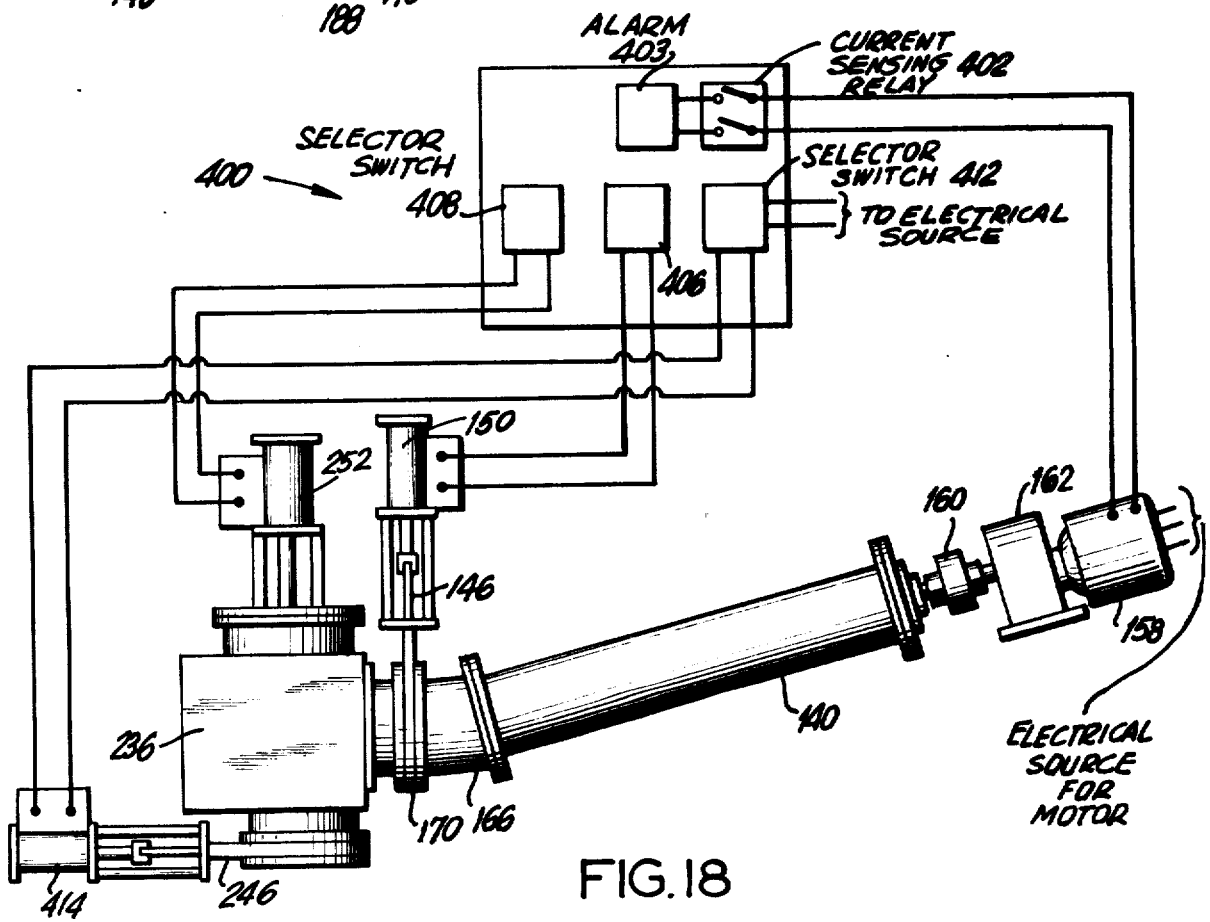
FIG. 18 is a schematic view of an electro-mechanical means for controlling the single piston and gate valve of the ejector shown in FIG. 14.

Referring now to FIG. 18, there is shown an illustrative embodiment of an electrical control means 400 for the single piston ejector 148. Here when the current sensing relay 402 closes and the alarm 403 goes off, the sequence is as follows: selector switch 406 is moved as previously described to cause the valve 146 to be closed; next a selector switch 412 is moved to its reverse actuating position to cause the actuator 414 to open the bottom gate valve 246; and then the selector switch 408 is moved to its forward actuating position to cause the piston 248 (See FIG. 14) to move downwardly to eject contaminate.

When the single piston 248 is at the end of its stroke, the switches 406, 408 and 414 are moved so as to reverse the current to raise the piston 248, to close the valve 246 and open the valve 146, in that sequence.

Operation

Figure 19:
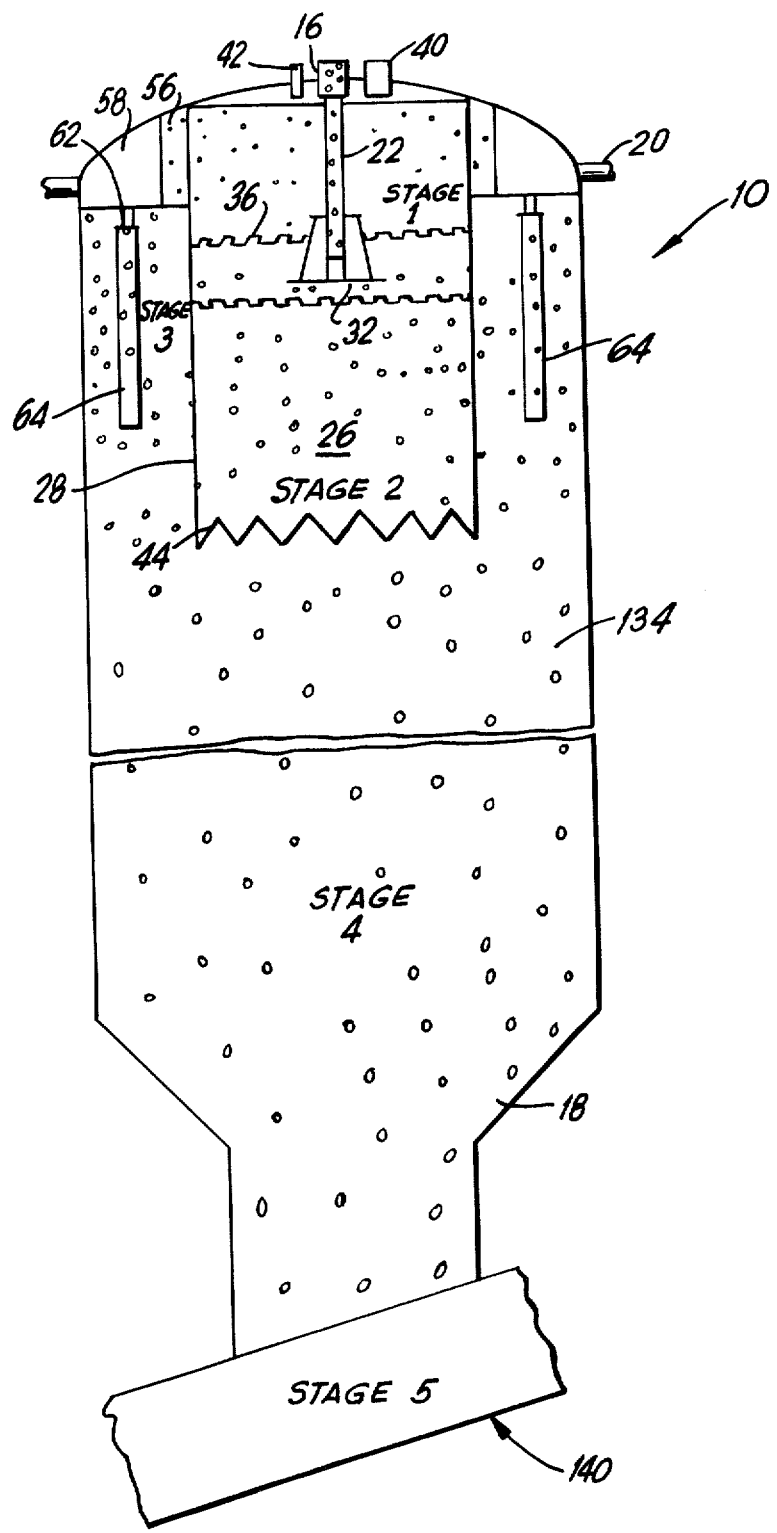
FIG. 19 is a schematic view of the tank of FIG. 1 showing the concurrent activities occurring in the several stages of the system.

Referring to FIG. 19 there is schematically shown the concurrent operations occuring within the tank 10.

The contaminated liquid material is charged into a liquid filled tank 10 at a predetermined velocity and is diffused radially outwardly through the liquid within the deceleration chamber 26 by the baffle 32 and diffuser 36 to considerably slow down its movement. In so doing low density particles are caused to be floated upwardly and thence outwardly, while the heavier particles are allowed to fall by gravity toward the waste outlet 18 of the tank 10.

This activity hereinbefore has been identified as stage 1. From this stage the liquid is further decelerated in chamber 26 and its direction is reversed by the static column of liquid below the deceleration chamber 26 and moved upwardly into the filtering stage. In making this transition solid particles from the liquid within the chamber 26, and the solid particles in the liquid changing direction of movement, settle or fall by means of gravity through the liquid in the static column of liquid to the waste outlet 18. This stage has been referred to herein as stage 2.

In stage 3 the liquid is filtered as it passes through the coated porous septums 64 within the filtering chamber 46. Filtered, purified liquid is then removed from the tank 10 via the purified liquid chamber 58 and the liquid outlet 20.

In stage 4 the effluent below the deceleration chamber 26 essentially is transformed into the static column of effluent. In this stage the decending solid particles from the deceleration chamber 26 and filtering chamber 46 along with the solid particles from the static column settle downwardly through said column to the waste outlet 18.

From the waste outlet 18 slurry containing the solid contaminate and liquid residue are removed through the tank outlet 18 into the compacting mechanism. In this fifth stage the liquid residue is removed and fed either into the tank or returned to a source for treatment, and the solids are compacted ready for salvage, by-product use, easy disposal and the like.

In a typical example of the preferred embodiment illustrated in FIG. 1 the tank and stand is approximately 13.5 feet high. The tank itself has a length of about 6.0 feet and a diameter of about four feet. It has a capacity of about 700 gallons. The inlet conduit has a diameter of 2.0 inches. The deceleration chamber is about 47 inches in length and 32 inches in diameter. The annular filtering chamber has a length of about 39 inches and an inner diameter of about 32 inches and an outer diameter of about 4 feet. Within the filtering chamber there are 28 septums, each having a diameter of about 2.75 inches, a length of about 30 inches, and a porous screen mesh about 100 microns. The filter aid on the septums is diatamaceous earth (John Mansville's diatamaceous earth sold as #545 CELITE). The coating is about 0.125 inches thick. The settling chamber is about 4 feet in diameter and is about 6.6 feet in length. Four 90° intersecting baffles are positioned within the tank about 10 inches below the deceleration and filtering chambers. The expulsion device which opens to the bottom of the tank includes a helical screw which was about 6 inches in diameter and about 40 inches long. The single and double piston ejectors of the invention are capable of compacting solids conveyed by the screw so that they easily can be handled without dripping water.

The purification system of the present invention is useful in serving municipal, industrial, commercial, marine and residential needs. The system can be used, for example, in liquid purification, removal of solid contaminates from sewage systems, textile and paper processes, removal of solid dye stuffs, food processing, asbestos and granite processes, air pollution scrubber systems, and marine operations. The system of the invention provides the needed balance between progress and growth and preservation and conservation of our resources.

In addition, various components of the structure preferably form modular sections for easy assembly, access and handling. As shown in FIG. 1, the cover 14, tank body 30 and expulsion device 140 can be separated from the system and from one another without requiring complete disassembly. Moreover, even parts of the different components can be assembled or dismantled without requiring assembly or disassembly of the other parts of that component. The expulsion device unit (motor 158, coupling 160 and gear reducer 162), screw press 144 and housing 142, conduit 166 and gate valve 146, and the ejector 148, can be assembled or disassembled without affecting the other parts of the expulsion device.

The invention in its broader aspect is not limited to the specific described embodiments and departures may be made therefrom within the scope of the accompanying claims without departing from the principals of the invention and without sacrificing its chief advantages.

We claim:

1. A multi-stage, single vessel, liquid purification system, comprising:

a tank having an inlet conduit for conveying liquid with solid contaminate into the tank, a deceleration chamber within said tank for receiving incoming liquid from said inlet conduit which is formed by a cylindrical tube centrally positioned within said tank and which depends from and about said inlet into the central portion thereof, wherein the breadth of said deceleration chamber as formed by said tube is substantially greater than the breadth of said inlet conduit for deceleration of incoming liquid and to allow lighter density solid particles in the contaminate to rise to the top of the liquid within the deceleration chamber for removal and the heavier density solid particles of the contaminate to settle downwardly through the deceleration chamber, a filter chamber within said tank and about said deceleration chamber which is formed by said tube and outer wall of said tank and within which depends septums for filtering out remaining solids from liquid which passes therethrough and to thereby provide purified liquid, a terminus at the end of said tube in the central portion of said tank which has a saw tooth configuration that inhibits turbulence of liquid containing solid contaminates as it leaves said tube, a purified liquid chamber within said tank and above said septums for receiving the purified liquid therefrom having outlet means for removal of the purified liquid from said tank, a settling chamber with turbulence inhibiter below said deceleration and filtering chambers for forming a static column of liquid which changes direction of liquid flow from said deceleration chamber into said filtering chamber, and in so doing, causing solid particles in the liquid changing direction to settle downwardly, and compacting means open into the bottom of said tank for receiving solid contaminates from said deceleration and filtering chambers and from said column of static liquid and for compacting said contaminates.

2. The multi-stage, single vessel, purification system according to claim 1 wherein said terminus is tapered inwardly to facilitate the movement of liquid containing solid contaminate from said tube.

3. The multi-stage, single vessel, purification system according to claim 1 wherein there are a plurality of said septums spaced about said annular chamber, and wherein each of said septums includes a filter aid coating thereon forming innumerable microscopic channels for the removal of solid contaminate from the liquid.

4. The multi-stage, single vessel, purification system according to claim 3 wherein the system includes hydroshock means operatively connected to each of said septums for delivering hydrodynamic shocks transmitted through liquid to said septums for removing filter aid coating and contaminate from each of said septums, and means connected into said tank for supplying fresh filter aid to each of said septums.

5. The multi-stage, single vessel, purification system according to claim 3 wherein the system includes hydropulsating means operatively connected to each of said septums for delivering pulsating waves of liquid to said septums for removing filter aid coating and contaminate from each of said septums, and means connected into said tank for supplying fresh filter aid to each of said septums.

6. A multi-stage, single vessel, liquid purification system, comprising:
   a tank having an inlet conduit in the top thereof for conveying liquid with solid contaminate downwardly into the tank,
   a deceleration chamber within said tank adapted to be filled with liquid and adapted to receive incoming liquid from said inlet conduit in the already liquid filled chamber, wherein the breadth of said deceleration chamber is substantially greater than the breadth of said inlet conduit for deceleration of incoming liquid, and for allowing lighter density solid particles in the contaminate to rise to the top of the liquid within the deceleration chamber for removal and for allowing the heavier density solid particles of the contaminate to settle downwardly from the deceleration chamber,
   a filter chamber within said tank and about said deceleration chamber having a plurality of septums spaced about said chamber, wherein each of said septums has a filter aid coating thereon forming innumerable microscopic channels for the removal of solid contaminate from the liquid as it passes therethrough, to thereby provide purified liquid within said septums,
   a purified liquid chamber within said tank and above said septums for receiving the purified liquid therefrom having outlet means for removal of the purified liquid from said tank,
   liquid force means operatively connected to said septums within said tank for transmitting forces of said septums through the liquid in said tank for removing filter aid and contaminate from said septums which settle downwardly from said tank,
   means connected into said tank for supplying fresh filter aid to said septums through the liquid in said tank,
   a settling chamber within said tank below said deceleration and filtering chambers for forming a static column of liquid which changes direction of liquid flow from said deceleration chamber into said filtering chamber, and in so doing, causing solid particles in the liquid changing direction to settle downwardly, and
   a compacting device connected to the bottom of said tank having:
      a tubular housing open to the bottom of said settling chamber for receiving solid contaminates and residue liquids, a rotatable screw within said housing for compacting the solid contaminates and transmitting them from said housing, and rib means which extend from the inner wall of said housing toward said screw to facilitate compacting and transmission of the solid contaminates and residue liquid and to provide a wiping action with said rotatable screw to prevent undesirable build up of solid contaminate thereon,
      a piston type ejector spaced from said housing and screw for receiving and further compacting solid contaminate while expressing residue liquid therefrom so that said compacted solid can be handled easily,
      a conduit connected to said housing and to said ejector for conveying solid contaminate and residue liquid from said housing to said ejector, and
      valve means in said conduit to control the movement of solid contaminate and residue liquid through said conduit to prevent flooding.

7. In the purification system of claim 6 which includes septums having a filter and a contaminate thereon, a hydroshock device for removing the filter aid and collected contaminate from the septums, comprising:
   a housing containing a liquid therein,
   a conduit connected to said housing for conveying the liquid therein to said septums,
   a diaphragm within said housing above and in contact with said liquid, and
   means connected to said diaphragm for vibrating said diaphragm to effect a hydronamic shock which travels through the liquid to said septums to cause the filter aid and contaminate to separate therefrom ready for a fresh coat of filter aid, and
   means operatively connected to said diaphragm actuating means and responsive to a predetermined build up of contaminate and filter aid on said septums which actuates said diaphragm vibrating means only when that build up renders the septums substantially ineffective.

8. The purification system of claim 6 which includes septums having a filter aid and contaminate thereon and a liquid force means for removing the filtering aid and contaminate therefrom, wherein said liquid force means comprises:
   conduit means for conveying liquid to the interior of the coated septums, and
   a pulsating pump in said conduit means for pulsating the liquid being conveyed to said septums so that the pulsating liquid causes removal of filter aid, readying the septums for a fresh coating of filter aid.

9. In the purification system of claim 6 which includes septums having a filter aid thereon, a device for removing the filter aid and contaminate therefrom, comprising:
   conduit means for conveying liquid to the interior of the coated septums,
   a pump in said conduit means for moving the liquid in said conduit means to the coated septums, and
   hydropulsating valve operatively connected to said pump for pulsating the liquid being moved to the coated septums by said pump so that the pulsating liquid causes removal of filter aid, readying the septums for a fresh coating of filter aid, and
   means operatively connected to said valve and responsive to a predetermined build up of filter aid and contaminate on said septums which actuates said valve only when the build up renders the septums substantially ineffective.

10. The compacting device of claim 6 wherein said rib means includes a continuous spiral rib having a decreasing pitch.

11. The compacting device of claim 6 wherein said rib means includes a continuous spiral rib.

12. The compacting device of claim 6 wherein said rib means includes a plurality of straight ribs spaced about said inner wall of said housing.

13. An ejector for removing residue liquid from solid contaminates and for compacting the solids so that upon ejection they can be handled easily, comprising:
- a housing having a chamber for receiving and compacting solid contaminates containing residue liquids, and means in said housing for allowing the residue liquids to be expressed from the solid contaminate and to flow from said chamber;
- an inlet in said housing open to said chamber for conveying solid contaminates containing residue liquid thereinto,
- outlet means in said housing open to said chamber for conveying solid contaminates from which residue liquid has been expressed from said housing,
- a double piston reciprocally mounted in said first chamber on a common piston rod adapted to extend thereinto wherein one piston is secured to said rod and the other piston is slidable on said rod and wherein said pistons form a channel therebetween which receives solid contaminate with residue liquid from said inlet,
- means connected to said rod for moving said one piston secured to said rod from said inlet to said outlet means with the solid contaminate and residue liquid moving said other slidable piston in the same direction as said piston,
- means operatively connected to said other slidable piston which limit the movement thereof at said outlet means while said one piston continues to be moved, to thereby continue to compact the solid contaminate and cause it to be ejected through said outlet means.

14. An ejector for removing residue liquid from solid contaminates and for compacting the solids so that upon ejection they can be handled easily, comprising:
- a housing having a vertical first chamber for receiving and compacting solid contaminates containing residue liquids, a residue liquid chamber for receiving liquids expressed from the solids being compacted in said first chamber, and means in said housing for allowing the expressed residue liquids to flow from said first chamber to said second chamber;
- an inlet in said housing open to the central portion of said first vertical chamber for conveying solid contaminates containing residue liquid thereinto;
- outlet means in said housing open to the lower portion of said first chamber for conveying solid contaminates from which residue liquid has been expressed for said housing;
- a piston reciprocally mounted in said first chamber for moving said solid contaminate from which residue liquid has been expressed from said first chamber;
- valve means operatively connected to said inlet which is open to allow solid contaminate with residue liquid to be conveyed therethrough into said first chamber and which is closed when the solids in said first chamber have been compacted and residue liquid has been expressed therefrom,
- valve means operatively connected to said outlet which is closed when the solids are being compacted and the residue liquid is being expressed therefrom in said first chamber, and which is open when the solids are compacted and residue liquid has been expressed therefrom; and
- a double piston reciprocally mounted in said first chamber on a common piston rod adapted to extend thereto wherein the upper piston is secured to said rod and the lower piston is slidable on said rod, and wherein said piston form a channel therebetween which receive solid contaminates with residue liquid from said inlet;
- means connected to said rod for moving said upper piston secured to said rod downwardly from said inlet to said outlet means with the solid contaminate moving said lower piston in the same direction while residue liquid is expressed from the solid contaminate into said second chamber through said means therebetween;
- means on said lower slidable piston cooperating with said housing which limit the downward movement thereof while the said upper piston continues to move downwardly, to thereby compact solid contaminate and cause it to be ejected through said outlet means.

15. The ejector of claim 14 wherein the lower surface of said upper piston is concave and the upper surface of lower piston is convex, to thereby form an angular annular channel therebetween which is higher at the center and lower at its outer periphery.

16. The ejector of claim 15 wherein the angle of curvature of said concave lower surface of said upper piston is less than the angle of curvature of said uper convex surface of said lower piston.

17. The ejector of claim 14 wherein said outlet means include a plurality of ports which extend through said housing in the lower portion thereof.

18. The ejector of claim 17 wherein said means on said lower piston include guide rods which extend outwardly through slots in said housing between said ports, and wherein the upper and lower peripheries of said slots cooperate with said rods to limit the reciprocal movement in said housing.

19. The ejector of claim 18 wherein said guide rods and cooperating peripheries of said slots stop the upper movement of said slidable piston at said inlet and the lower movement of said slidable piston at said ports.

* * * * *